(12) United States Patent
Park et al.

(10) Patent No.: US 7,342,739 B2
(45) Date of Patent: Mar. 11, 2008

(54) METHOD, MEDIUM, AND APPARATUS COMPENSATING FOR TORQUE VARIATIONS BASED ON TEMPERATURE

(75) Inventors: Cheol-hoon Park, Suwon-si (KR); Nam-guk Kim, Anyang-si (KR); Sang-hoon Chu, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 73 days.

(21) Appl. No.: 11/186,756

(22) Filed: Jul. 22, 2005

(65) Prior Publication Data

US 2006/0007591 A1 Jan. 12, 2006

(30) Foreign Application Priority Data

Jul. 23, 2004 (KR) .................. 10-2004-0057545

(51) Int. Cl.
*G11B 5/596* (2006.01)
*G11B 21/02* (2006.01)

(52) U.S. Cl. ..................... 360/78.04; 360/75
(58) Field of Classification Search ............... None
See application file for complete search history.

(56) References Cited

U.S. PATENT DOCUMENTS 5,898,286 A 4/1999 Clare et al. ............ 318/569
6,342,985 B1 1/2002 Clare et al. ............ 360/75
6,903,897 B1 * 6/2005 Wang et al. ............ 360/78.07

FOREIGN PATENT DOCUMENTS

| JP | 2002-367307 | 12/2002 |
|---|---|---|
| JP | 2003-323790 | 11/2003 |
| KR | 1998-069983 | 10/1998 |

OTHER PUBLICATIONS

Korean Office Action with English-language translation, Jan. 26, 2006.

* cited by examiner

*Primary Examiner*—Andrew L. Sniezek
(74) *Attorney, Agent, or Firm*—Staas & Halsey LLP

(57) ABSTRACT

A method, medium, and apparatus controlling a hard disk drive, and particularly, embodiments include methods, media, and apparatuses compensating for torque variations with respect to temperature variations in a seek servo operation, compensating for differences between modeling torque constants, used for servo designing, and actual torque constants. The method includes controlling gain of a seek control loop to vary depending on a torque constant temperature compensation value corresponding to a measured temperature of the hard disk drive, the seek control loop generating a seek driving current to be applied to a voice coil in the seek mode.

10 Claims, 6 Drawing Sheets

METHOD, MEDIUM, AND APPARATUS COMPENSATING FOR TORQUE VARIATIONS BASED ON TEMPERATURE

CROSS-REFERENCE TO RELATED APPLICATIONS

This application claims the benefit of Korean Patent Application No. 10-2004-0057545, filed on Jul. 23, 2004, in the Korean Intellectual Property Office, the disclosure of which is incorporated herein in its entirety by reference

BACKGROUND OF THE INVENTION

1. Field of the Invention

Embodiments of the present invention relate to a method, medium, and apparatus controlling a disk drive, and more particularly, to a method, medium, and apparatus compensating for torque variations depending on temperature in a seek servo operation to compensate for a difference between a model torque constant and an actual torque constant based on temperature variations in a disk drive.

2. Description of the Related Art

A data storage device, i.e., a hard disc drive contributes to a computer system operation by reproducing data from a disc or writing data to the disc using a magnetic head. With increasingly high capacity, high density, and compact structures of hard disc drives, a bit per inch (BPI) indicating a density in a rotating direction of a disc and a track per inch (TPI) indicating a density in a radial direction thereof have also been increasing. As a result, controlling mechanisms with finer control capabilities are desired.

A hard disc drive can include a plurality of magnetic transducers that read and/or write, respectively, information by sensing and magnetizing a magnetic field of a rotating disc. Information can be stored in a plurality of sectors positioned within an annular track, for example. Track numbers can be positioned across a surface of a disc, with numbers for vertically similar tracks being referred to as cylinder numbers, for example. Accordingly, here, each track may be defined by a cylinder number.

Each transducer can typically be integrated within a slider included in a head gimbal assembly (HGA). An HGA may be attached to an actuator arm, which has a voice coil positioned adjacent to a magnetic assembly. The voice coil and the magnetic assembly can define a VCM. A hard disc drive also typically includes a driving circuit and a controller to supply current that excites the VCM. The VCM can rotate the actuator arm and thereby move transducers across a surface of a disc.

When writing and/or reading information, the hard disc drive may perform a seek routine to move the transducers from one cylinder to another cylinder. During the seek routine, the VCM can be excited by current that moves the transducers to a new cylinder position across the surface of the disc. The controller can perform a servo routine to guarantee that the transducers are moved to an exact cylinder position and the center of a track.

Generally, it is preferable to minimize the time required to read information from or write information to a disc. Accordingly, the seek routine performed by the hard disc drive should be implemented so that the transducers are moved to a new cylinder position within a short period of time. In addition, the time required for stabilizing the HGA should be minimized so that the transducers can quickly write or read information and are positioned adjacent to the new cylinder at one time.

In seek mode, a seek current can be applied to the VCM by generating acceleration, velocity, and position trajectories for the transducers with respect to a seek distance and feeding back to the VCM errors between a design velocity and current velocity of the transducers and between a design position and current position of the transducers. Here, the design velocity and design position of the transducers can be determined based on the acceleration trajectory of the transducers with respect to the seek distance.

Head disk assemblies may have different torque constants when their VCMs or driving circuits have different performances. In addition, portions of a head disk assembly have different torque constants because the magnetic field generated by the magnet used in the VCM varies from portion to portion of the corresponding head disk assembly.

Thus, conventionally, a torque constant compensation table is formed by measuring a difference between a modeling torque constant of each portion of a head disk assembly for the VCM, which is determined during a stage of servo designing, e.g., during design or manufacture, and an actual torque constant of each portion of the head disk assembly for the VCM, e.g., during operation. The modeling torque constant for each portion of the head disk assembly can then be calibrated by referencing the torque constant compensation table.

However, the temperature of a hard disk drive may vary due to heat generated during operations or changes in the external environment. The variation of the temperature of the hard disk drive causes both the magnetic force of the magnet and the resistance of the voice coil to vary. The variation of the magnetic force of the magnet and the resistance of the voice coil also eventually causes a torque constant of each portion of the head disk assembly for the VCM to vary.

Thus, the variation of the temperature of the hard disk drive results in a difference between a modeling torque constant of each portion of the head disk assembly for the VCM and an actual torque constant of each portion of the head disk assembly for the VCM. A large difference between the modeling torque constants and the actual torque constants adversely affect the servo performance of the hard disk drive, so the hard disk drive cannot maintain its seek servo operation as precisely and quickly as it used to.

SUMMARY OF THE INVENTION

Embodiments of the present invention set forth a method, medium, and apparatus compensating for torque variations with respect to temperature variations in a recording and/or reproducing apparatus, e.g., a disk drive, which minimizes differences between modeling torque constants and actual torque constants caused by variation of temperatures in a disk drive.

To achieve the above and/or other aspects and advantages, embodiments of the present invention include a method of controlling a hard disk drive, including controlling gain of a seek control loop to vary based on a torque constant temperature compensation value, corresponding to a measured temperature of the hard disk drive, with the seek control loop generating a seek driving current for application to a voice coil in a seek mode of the hard disk drive.

The torque constant temperature compensation value may be determined by respectively measuring torque constants at a plurality of zones of a disk at each of a plurality of temperatures, calculating an average torque constant for each of the plurality of temperatures using the measured torque constants, and generating a normalized torque constant temperature compensation value for each of the plurality of temperatures by dividing the calculated average torque constant, for each of the temperatures, by an average torque constant for a reference temperature. Here, the reference temperature may be room temperature.

The gain of the seek control loop may be compensated for by multiplying a torque constant position compensation value, corresponding to a current position of a head of the hard disk drive, by a torque constant temperature compensation value, corresponding to the measured temperature of the hard disk drive. The torque constant position compensation value, corresponding to the measured temperature of the hard disk drive, may also be obtained by dividing the torque constant position compensation value, corresponding to the current position of the head, measured at the current position of the head during a burn-in operation, by a normalized torque constant temperature compensation value corresponding to a temperature of the hard disk drive measured during the burn-in operation.

To achieve the above and/or other aspects and advantages, embodiments of the present invention include an apparatus controlling a hard disk drive, including a seek control circuit to generate a seek driving current for moving a transducer to a target track through a seek control loop by using at least one of design acceleration, design velocity, and design position trajectories, a temperature sensing unit to measure a temperature of the hard disk drive, a memory to store a torque constant position compensation table and a torque constant temperature compensation table, a control unit to compensate for gain of the seek control loop by reading a torque constant position compensation value, corresponding to a position of the transducer, from the torque constant position table in the memory and reading a torque constant temperature compensation value, corresponding to the measured temperature of the hard disk drive from the torque constant temperature table in the memory, a position-based/temperature-based torque constant compensation unit to generate a torque-compensated seek driving current by multiplying each of the torque constant position compensation value and the torque constant temperature compensation value by the seek driving current, and a voice coil motor driving unit to drive the transducer using the generated torque-compensated seek driving current.

The torque constant temperature compensation table may be formed by respectively measuring torque constants at a plurality of zones on a disk at each of a plurality of temperatures, calculating average torque constants for each of the temperatures using the measured torque constants, and generating normalized torque constant temperature compensation values for each of the temperatures by dividing an average torque constant, for each of the zones and for each of the temperatures, by an average torque constant for a reference temperature.

The torque constant position compensation table may be formed by dividing torque constant position compensation values, respectively measured at a plurality of zones on a disk during a burn-in operation, by a normalized torque constant temperature compensation value corresponding to a temperature of the burn-in operation. In addition, the control unit may control the measuring of the temperature of the hard disk drive whenever a spindle motor rotates and updates a torque constant temperature compensation value to be applied to the position-based/temperature-based torque constant compensation unit by reading a torque constant temperature compensation value corresponding to the measured temperature of the hard disk drive from the torque constant temperature compensation table.

To achieve the above and/or other aspects and advantages, embodiments of the present invention include a recording and/or reproducing apparatus, including a transducer movable across a medium to record and/or reproduce data from the medium, and an apparatus according to embodiments of the present invention to control movement of the transducer.

To achieve the above and/or other aspects and advantages, embodiments of the present invention include a recording and/or reproducing apparatus, including a transducer movable across a medium to record and/or reproduce data from the medium, and a control unit to control movement of the transducer according to the embodiments of the present invention.

To achieve the above and/or other aspects and advantages, embodiments of the present invention include at least one medium including computer readable code implementing embodiments of the present invention.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
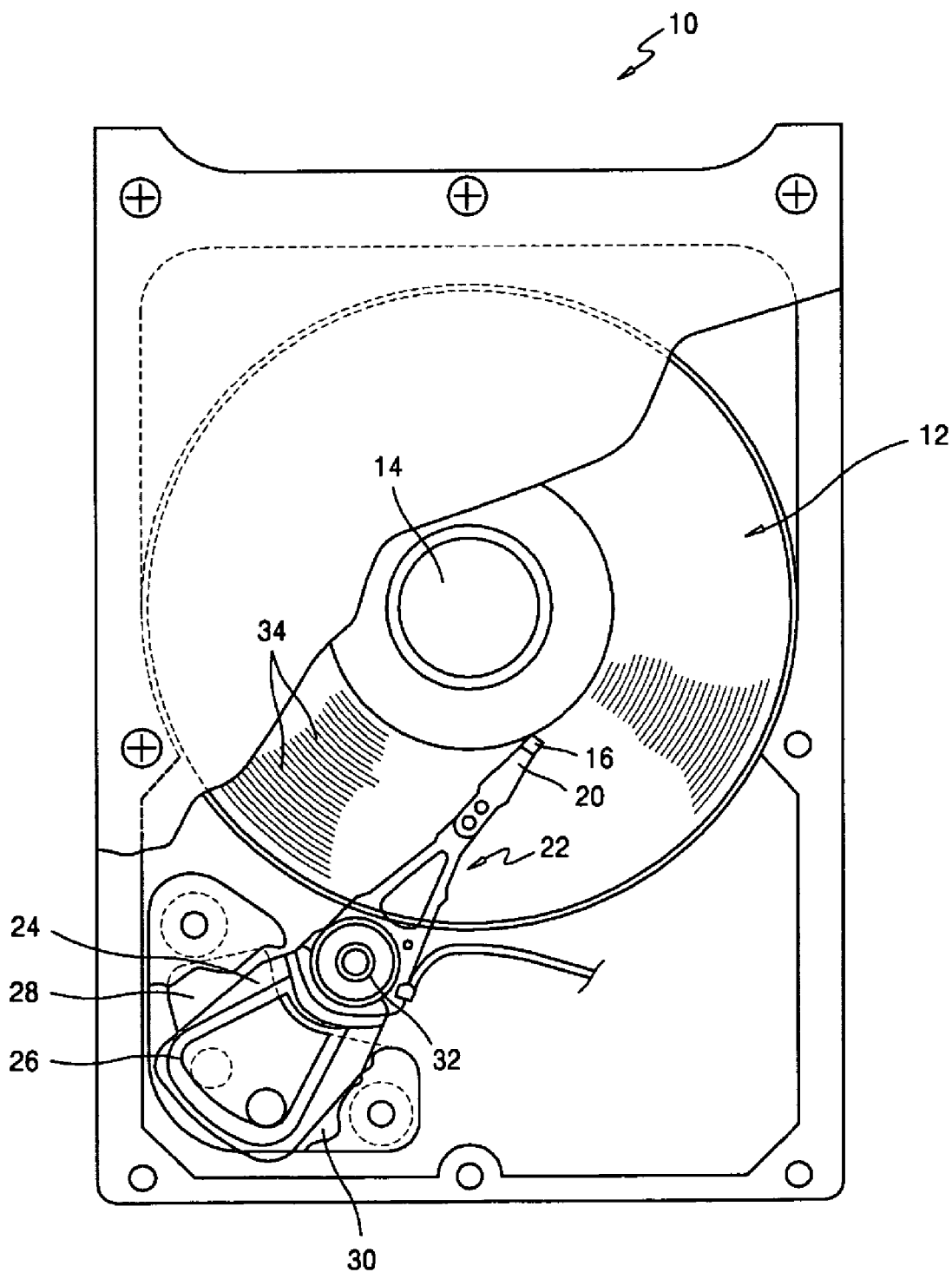
FIG. 1 illustrates a hard disk drive for which embodiments of the present invention can be applied.

Reference will now be made in detail to embodiments of the present invention, examples of which are illustrated in the accompanying drawings, wherein like reference numerals refer to the like elements throughout. The embodiments are described below to explain the present invention by referring to the figures.

FIG. 1 illustrates a hard disk drive 10 to which embodiments of the present invention may be applied. Referring to FIG. 1, the hard disk drive 10 includes at least one magnetic disk 12, which can be rotated by a spindle motor 14. The hard disk drive 10 may also include a transducer 16, located in the vicinity of the surface of the magnetic disk 12.

When the magnetic disk 12 rotates, the transducer 16 can read information from or write information to the magnetic disk 12 by, respectively, sensing the magnetic field of the magnetic disk 12 or magnetizing the magnetic disk 12. Generally, the transducer 16 is associated with the surface of the disk 12. Even though the transducer 16 is illustrated in FIG. 1 as a single device, the transducer 16 could be considered as including two elements, i.e., a write transducer for writing data to the magnetic disk 12 by magnetizing the magnetic disk 12 and a read transducer for reading data from the magnetic disk 12 by sensing the magnetic field of the magnetic disk 12. The read transducer may be made of a magneto-resistive material.

The transducer 16 may be integrated into a slider 20. The slider 20 can have a structure such that it can generate an air bearing between the transducer 16 and the surface of the magnetic disk 12. The slider 20 can be coupled to a head gimbal assembly (HGA) 22, attached to an actuator arm 24, and may include a voice coil 26. The voice coil 26 is located in the vicinity of a magnetic assembly 28, defining a voice coil motor (VCM) 30. A current supplied to the voice coil 26 generates a torque that rotates the actuator arm 24 about a bearing assembly 32. The rotation of the actuator arm 24 can thereby move the transducer 16 across the surface of the magnetic disk 12.

Information is generally stored in each track 34, for example, on the magnetic disk 12. Each track 34, which can be circular, can include a plurality of sectors, with each sector including a data field and an identification field, for example. The identification field can include gray codes for identifying the corresponding sector and a corresponding track. The transducer 16 can be moved across the surface of the magnetic disk 12 from one track to another track on the magnetic disk 12 to read information on or write information to the magnetic disk 12.

An operation of an electronic system of the hard disk drive 10 will now be described in greater detail.

Figure 2:
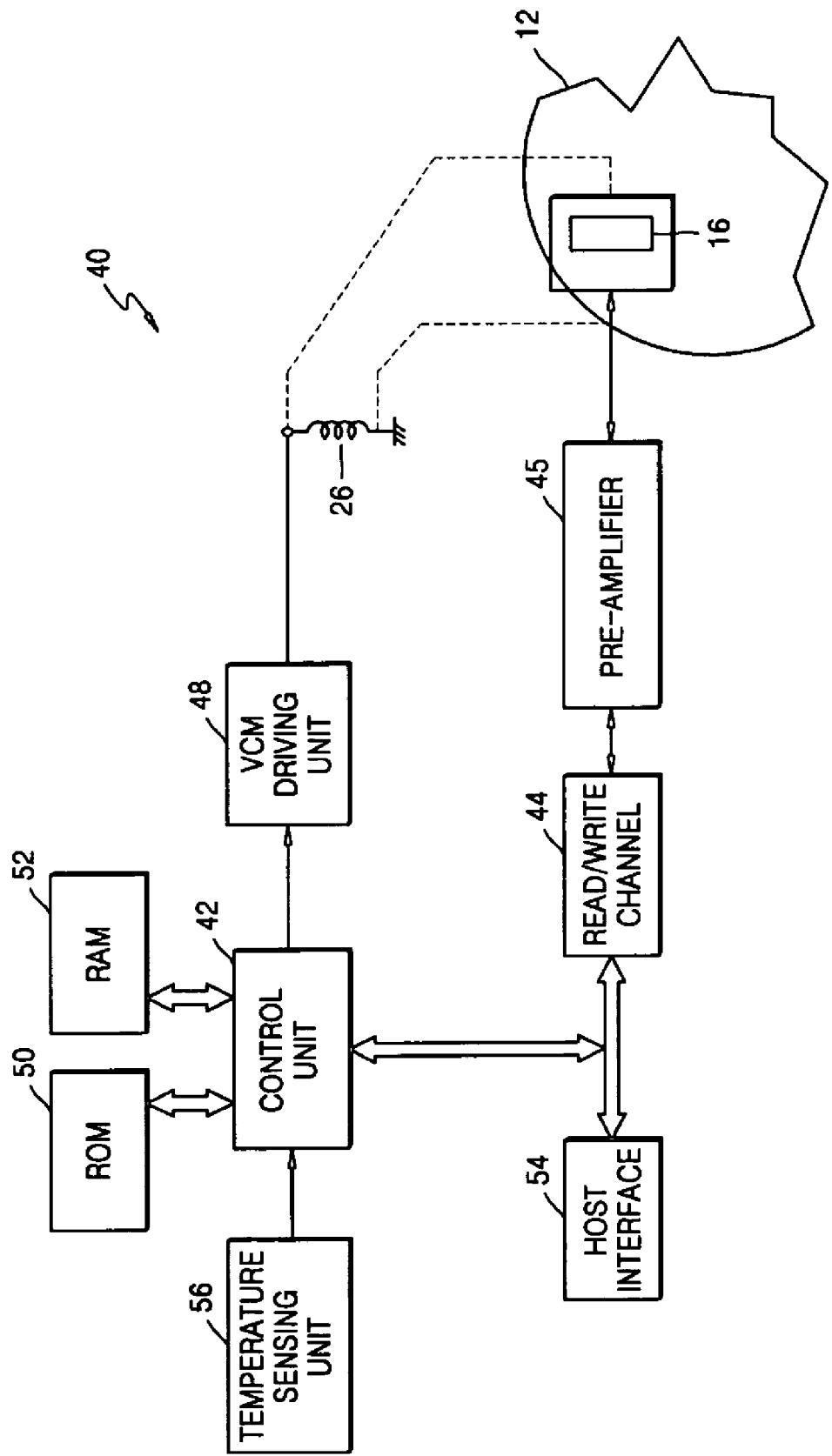
FIG. 2 illustrates a block diagram of an electronic system to control a hard disk drive, according to an embodiment of the present invention.

FIG. 2 illustrates a block diagram of an electronic system 40 for controlling the hard disk drive 10 of FIG. 1, according to an embodiment of the present invention. Referring to FIG. 2, the electronic system 40 can include the magnetic disk 12, the transducer 16, a control unit 42, a read/write channel 44, a preamplifier 45, a VCM driving unit 48, a ROM 50, a RAM 52, a host interface 54, and a temperature sensing unit 56, for example.

Data necessary for the operation of the hard disk drive 10, particularly, a torque constant position compensation table and related information, can be stored in a maintenance cylinder of the magnetic disk 12, for example.

Commands and data that the control unit 42 use to execute software routines can be stored in the ROM 50, for example. One of the software routines may be a seek routine, which moves the transducer 16 from one track to another track on the magnetic disk 12. The seek routine may include a servo control routine, which moves of the transducer 16 to a desired track on the magnetic disk 12. For example, various equations necessary for generating a sinusoidal acceleration trajectory may be stored in the ROM 50. In addition, a torque constant temperature compensation table and related information may also be stored in the ROM 50, for example.

In an embodiment, the torque constant position compensation table is stored in a maintenance cylinder of the magnetic disk 12, and the torque constant temperature compensation table is stored in the ROM 50. However, the torque constant position compensation table and the torque constant temperature compensation table can be stored in any of the maintenance cylinder of the magnetic disk 12 and/or the ROM 50.

A method of generating the torque constant temperature compensation table and the torque constant position compensation table will be now be described in greater detail, with the following reference to FIG. 4.

Figure 4:
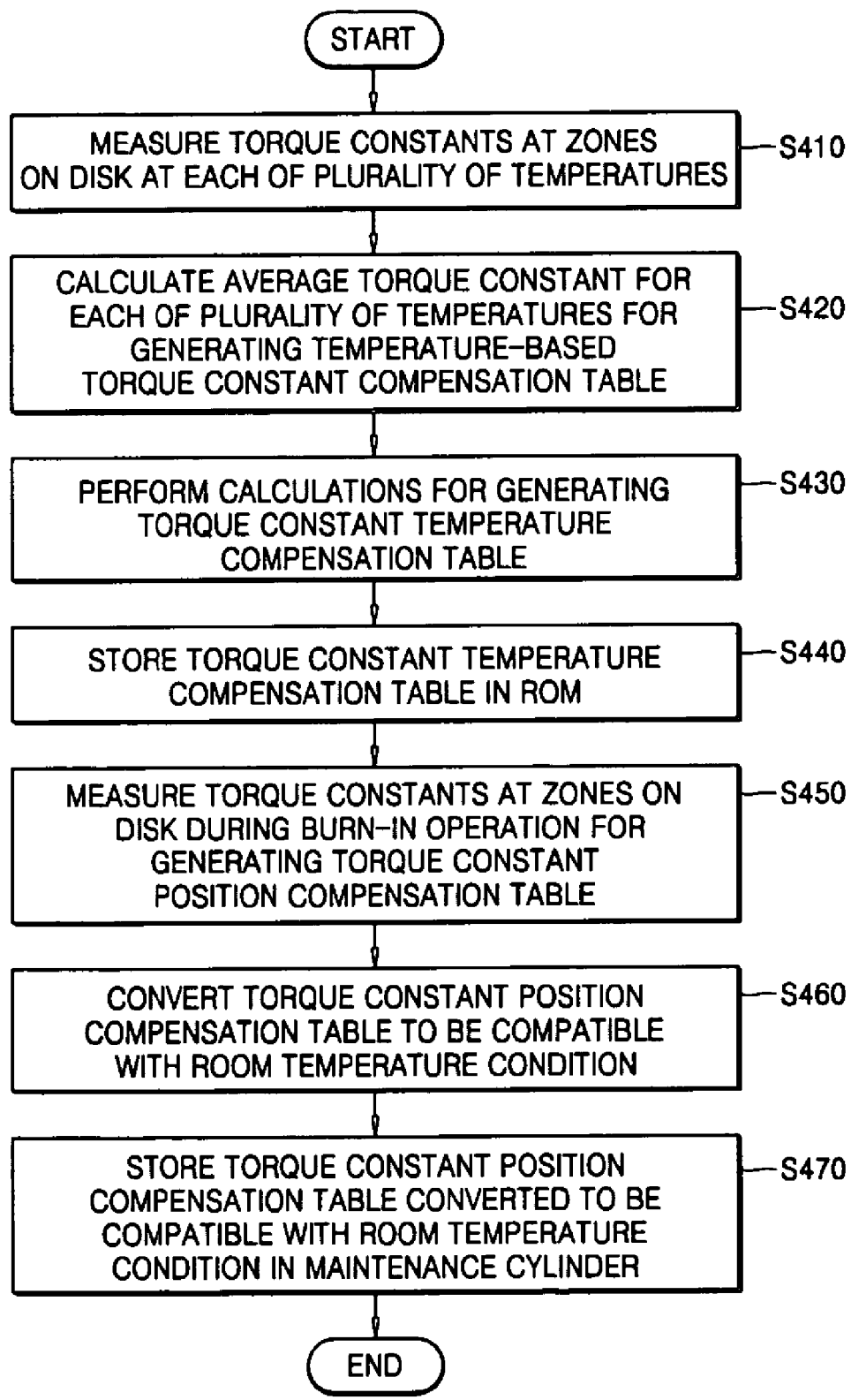
FIG. 4 illustrates a flowchart of a method of generating a torque constant temperature compensation table and a torque constant position compensation table for a disk drive, according to an embodiment of the present invention.
Figure 6:
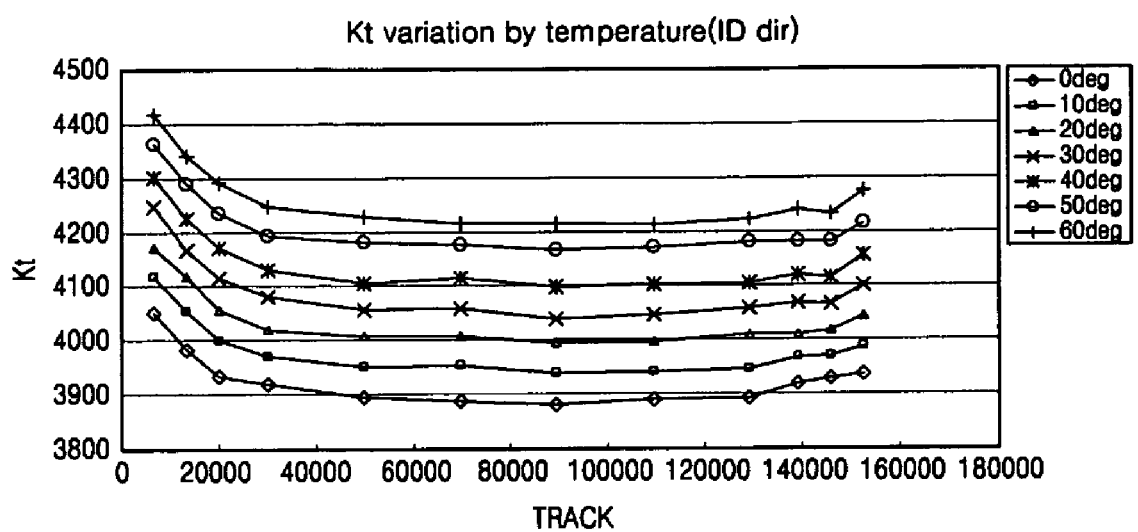
FIG. 6 graphically illustrates a variation of a torque constant with respect to the variation of temperature.

Referring to FIG. 4, in operation S410, a position-based torque constant compensation table can be formed by using torque constant compensation values respectively measured at a plurality of zones on the magnetic disk 12 while gradually varying the temperature of the magnetic disk 12. For example, while sequentially varying the temperature of the magnetic disk 12 from 0° to 10°, from 10° to 20°, from 20° to 30°, from 30° to 40 °, from 40° to 50°,and from 50° to 60°, torque constant compensation values can respectively be measured along the zones on the magnetic disk. Exemplary measurement results are illustrated in FIG. 6.

In operation S420, the torque constant compensation values respectively measured along the zones on the magnetic disk at each of the temperatures 10°, 20°, 30°, 40°, 50°, and 60° can be averaged. Specifically, the torque constant compensation values respectively measured along the zones on the magnetic disk, e.g., at each of the temperatures 10°, 20°, 30°, 40°, 50°, and 60° can be summed, and then the summation result can be divided by a total number of zones on the magnetic disk 12, thereby obtaining a torque constant compensation average value for each of the temperatures 10°, 20°, 30°, 40°, 50°, and 60°.

Figure 7:
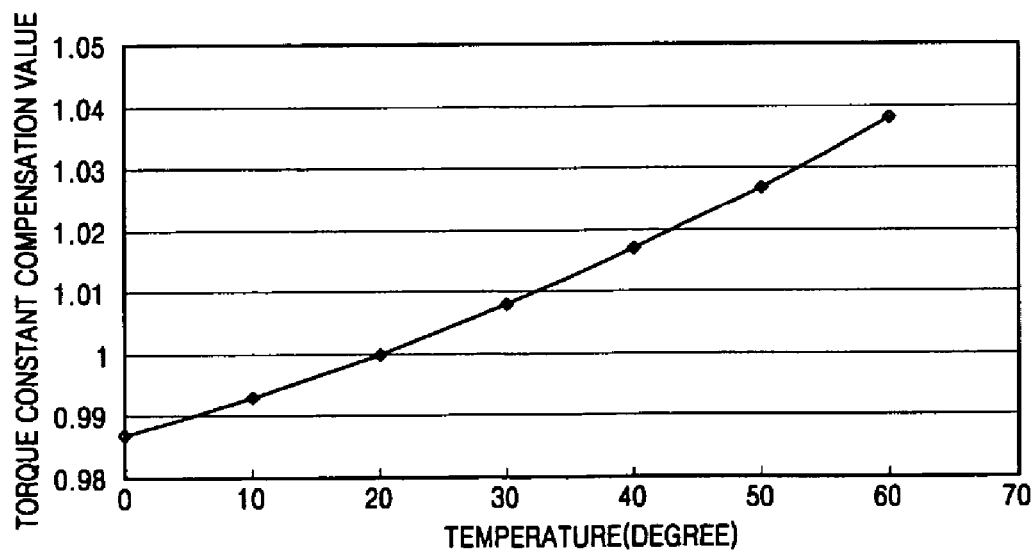
FIG. 7 graphically illustrates an extent to which a torque constant should be compensated depending on temperature, according to an embodiment of the present invention.

In operation S430, a torque constant temperature compensation table can be formed by using the result of the dividing of the torque constant compensation average value for each of the temperatures 10°, 20°, 30°, 40°, 50°, and 60°, by a torque constant compensation average value for a reference temperature. Specifically, the torque constant temperature compensation table is formed through normalization by using the torque constant compensation average value for the reference temperature. Preferably, but not necessarily, the reference temperature may be set to room temperature (e.g., 20°). Exemplary torque constant temperature compensation values kt_t (cal) stored in the torque constant temperature compensation table, based on the reference temperature being set to room temperature, are illustrated in FIG. 7.

In operation S440, the control unit 42 can store the torque constant temperature compensation table, obtained through the temperature normalization in operation S430, in the ROM 50.

In operation S450, torque constant position compensation values kt_p (cal) can be respectively measured along zones on the magnetic disk during a burn-in operation, and then a torque constant position compensation table can be formed by using the torque constant position compensation values kt_p.

In operation S460, the torque constant position compensation table can be converted to be compatible with the room temperature condition by dividing torque constant position compensation values kt_p, in the torque constant position compensation table, by a torque constant temperature compensation value kt_t, corresponding to the temperature of the hard disk drive 10 during the burn-in operation. Here, the torque constant temperature compensation value kt_t, corresponding to the temperature of the hard disk drive 10 during the burn-in operation, is read from the torque constant temperature compensation table, as shown in FIG. 7.

In operation S470, the control unit 42 can control the writing of the torque constant position compensation table, converted to be compatible with the room temperature condition, into the maintenance cylinder of the magnetic disk 12.

The torque constant temperature compensation table and the torque constant position compensation table may be determined in the above described manner, for example.

Data for the operation of the hard disk drive 10, which includes the torque constant position compensation table read from the maintenance cylinder of the magnetic disk 12, whenever a booting operation is executed, and the torque constant temperature compensation table, read from the ROM 50, are loaded into the RAM 52.

The preamplifier 45 can include an amplification circuit that amplifies a signal sensed by the transducer 16 and a read current control circuit that provides an optimal read current, for each temperature, to the transducer 16. The preamplifier 45 may also include a write current control circuit that provides an optimal write current, for each temperature, to the transducer 16.

The operation of the hard disk drive 10 will now be described in greater detail.

In a data read mode, the hard disk drive 10 enables the preamplifier 45 to amplify an electric signal sensed from the magnetic disk 12 by the transducer 16 (e.g., a head) in order to facilitate the processing of the electric signal. Thereafter, the read/write channel 44 codes an analog signal, which is the amplification result output from the preamplifier 45, into a digital signal that can be read by a host device (not shown), converts the digital signal into stream data, and transmits, the stream data to the host device via the host interface 54.

In a data write mode, the hard disk drive 10 receives data from the host device via the host interface 54, enables the read/write channel 44 to convert the received data into a binary data stream, and records the binary data stream on the magnetic disk 12 with a write current amplified by the preamplifier 45.

The temperature sensing unit 56 measures the temperature of the inside, for example, of the hard disk drive 10. An example of the temperature sensing unit 56 may be a thermistor.

The control unit 42 can control the hard disk drive 10 overall. In addition, the control unit 42 can analyze commands input thereto via the host interface 54 and control the commands to be executed. Moreover, the control unit 42 can read a torque constant temperature compensation value kt_t, corresponding to the temperature of the hard disk drive 10 measured by the temperature sensing unit 56, from the torque constant temperature compensation table, stored in the RAM 50, whenever a spindle motor rotates and controls the torque constant temperature compensation value kt_t to be applied to a position-based torque constant compensation unit 74.

The control unit 42 is coupled to the VCM driving unit 48, which supplies a driving current to the voice coil 26, and transmits a control signal to the VCM driving unit 48 in order to control the excitation of a VCM and the movement of the transducer 16.

Figure 3:
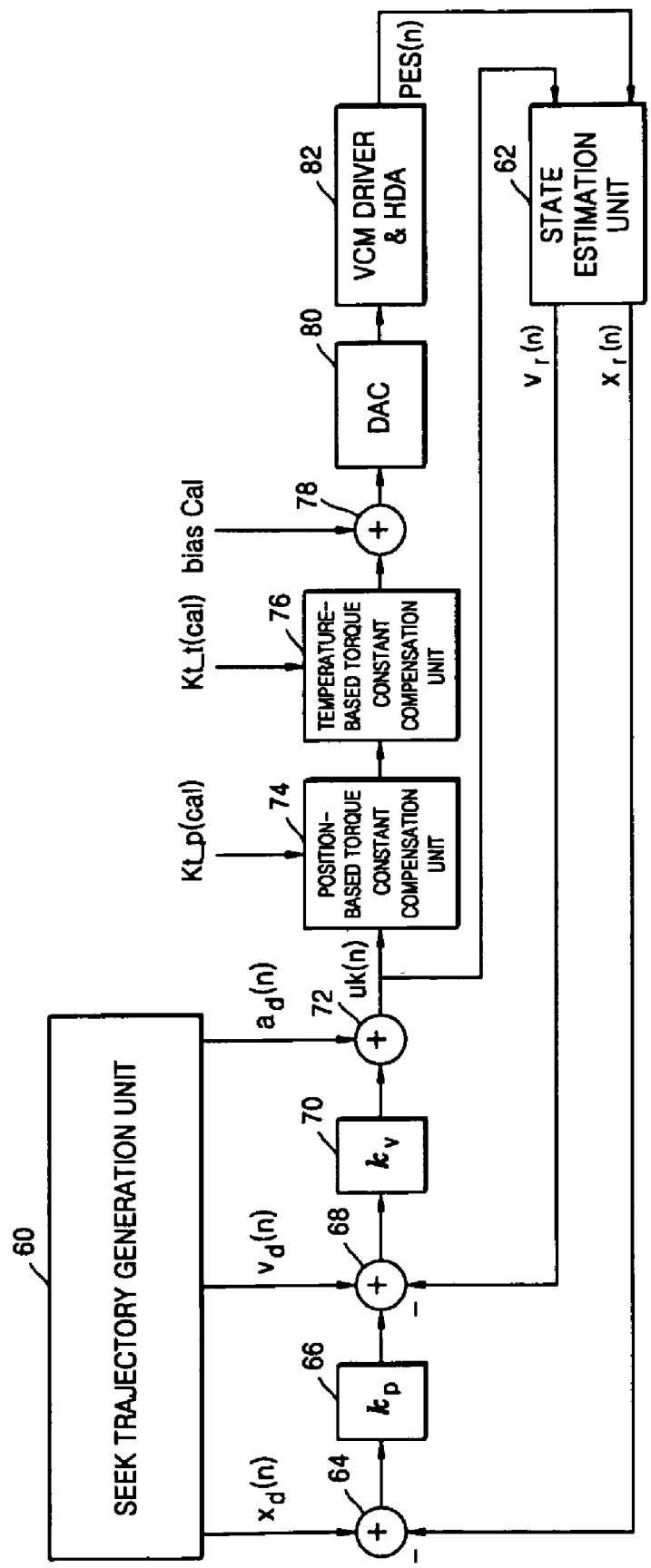
FIG. 3 illustrates a block diagram of a track seek servo control system for a hard disk drive, according to an embodiment of the present invention.

FIG. 3 illustrates a block diagram of a track seek servo control system, according to an embodiment of the present invention, which includes hardware and software executed under the control of the control unit 42, for example. Referring to FIG. 3, the track seek servo control system moves the transducer 16 so that the transducer 16 can be precisely placed over a target track on the magnetic disk 12. The control unit 42 then executes a seek routine, which moves the transducer 16 from a current track to the target track on the magnetic disk 12. While being moved across the surface of the magnetic disk 12 from the current track to the target track, the transducer 16 can read gray codes of the intervening tracks. The gray codes read by the transducer 16 can also be used for periodically determining whether the transducer 16 moves across the surface of the magnetic disk 12 at a target velocity and at a target acceleration.

The track seek servo control system can include a state estimation unit 62, including software and hardware, or example. The state estimation unit 62 can determine the distance that the transducer 16 has moved from the current track and an actual position $x_r(n)$ of the transducer 16. Specifically, the state estimation unit 62 can determine the actual position $x_r(n)$ of the transducer 16 by reading gray codes of a track above which the transducer 16 is currently located. The state estimation unit 62 can also determine the actual velocity $v_r(n)$ of the transducer 16. While the control unit 42 precisely controls the movement of the transducer 16, moving the transducer 16 from the current track to the target track, gray codes may also be periodically sampled from the intervening tracks.

A seek trajectory generator 60 can calculate a design position $x_d(n)$, design velocity $v_d(n)$, and design acceleration $a_d(n)$ of the transducer 16 based on a sinusoidal acceleration trajectory, velocity trajectory, and position trajectory of the transducer 16, obtained whenever the transducer 16 reads gray codes from the tracks of the magnetic disk 12. Here, the velocity and position trajectories of the transducer 16 can be obtained by integrating the sinusoidal acceleration trajectory of the transducer 16.

A first summation unit 64 subtracts the actual position $x_r(n)$ from the design position $x_d(n)$. A position control gain compensation unit 66 then generates a position compensation value by multiplying a difference between the actual position $x_r(n)$ and the design position $x_d(n)$ by a position gain $k_p$, for compensating for the position of the transducer 16.

A second summation unit 68 adds the position compensation value generated by the position control gain compensation unit 66 to the design velocity $v_d(n)$ and subtracts the actual velocity $v_r(n)$ from the addition result.

A velocity control gain compensation unit 70 can then generate a velocity correction value by multiplying the subtraction result, output from the second summation unit 68, by a velocity gain $k_v$, for compensating the velocity of the transducer 16.

A third summation unit 72 can generate a VCM driving current value uk(n) by summing the velocity correction value and the design acceleration $a_d(n)$. Here, the VCM driving current value uk(n) corresponds to a seek driving current value.

A position-based torque constant compensation unit 74 can then compensate for the variation of a torque constant with respect to the variation of the position of the transducer 16 by multiplying the VCM driving current value uk(n) by a torque constant position compensation value kt_p, for the position of the transducer 16 (particularly, a zone on the magnetic disk 12 where the transducer 16 is currently located), matching a result of a search in the torque constant position compensation table loaded into the RAM 52.

A temperature-based torque constant compensation unit 76 can compensate for the variation of the torque constant with respect to the variation of the temperature of the hard disk drive 10 by multiplying an output of the position-based torque constant compensation unit 74 by a torque constant temperature compensation value kt_t, for the temperature of the hard disk drive 10, matching a result of a search in the torque constant temperature compensation table loaded into the RAM 52.

A fourth summation unit 78 can then generate a digital current value for driving the VCM by summing a bias value bias_cal with an output of the temperature-based torque constant compensation unit 76.

A digital-to-analog converter (DAC) 80 then converts the digital current value output from the fourth summation unit 78 into an analog current value and applies the analog current value to a VCM driver and HDA unit 82. Then, the VCM driver and HDA unit 82 supplies a torque-compensated seek driving current value, which has been successfully torque-compensated both temperature-wise and position-wise based on the position of the transducer 16 and the temperature of the hard disk drive 10, to the VCM.

As described above, the torque-compensated seek driving current uk_c, with which the VCM is to be driven, can be obtained by multiplying a torque constant position compensation value kt_p corresponding to the position of the transducer 16 by the seek driving current value uk(n), multiplying the multiplication result by a torque constant temperature compensation value kt_t corresponding to the temperature of the hard disk drive 10, and then adding the latter multiplication result to the bias value bias_cal. Accordingly, a gain value of a seek control loop varies depending on the torque constant position compensation value kt_p and the torque constant temperature compensation value kt_t.

A method of compensating for seek loop gain based on the temperature of the hard disk drive 10 and a seek position by using the torque constant position compensation table and the torque constant temperature compensation table will now be further described with reference to FIG. 5.

Figure 5:
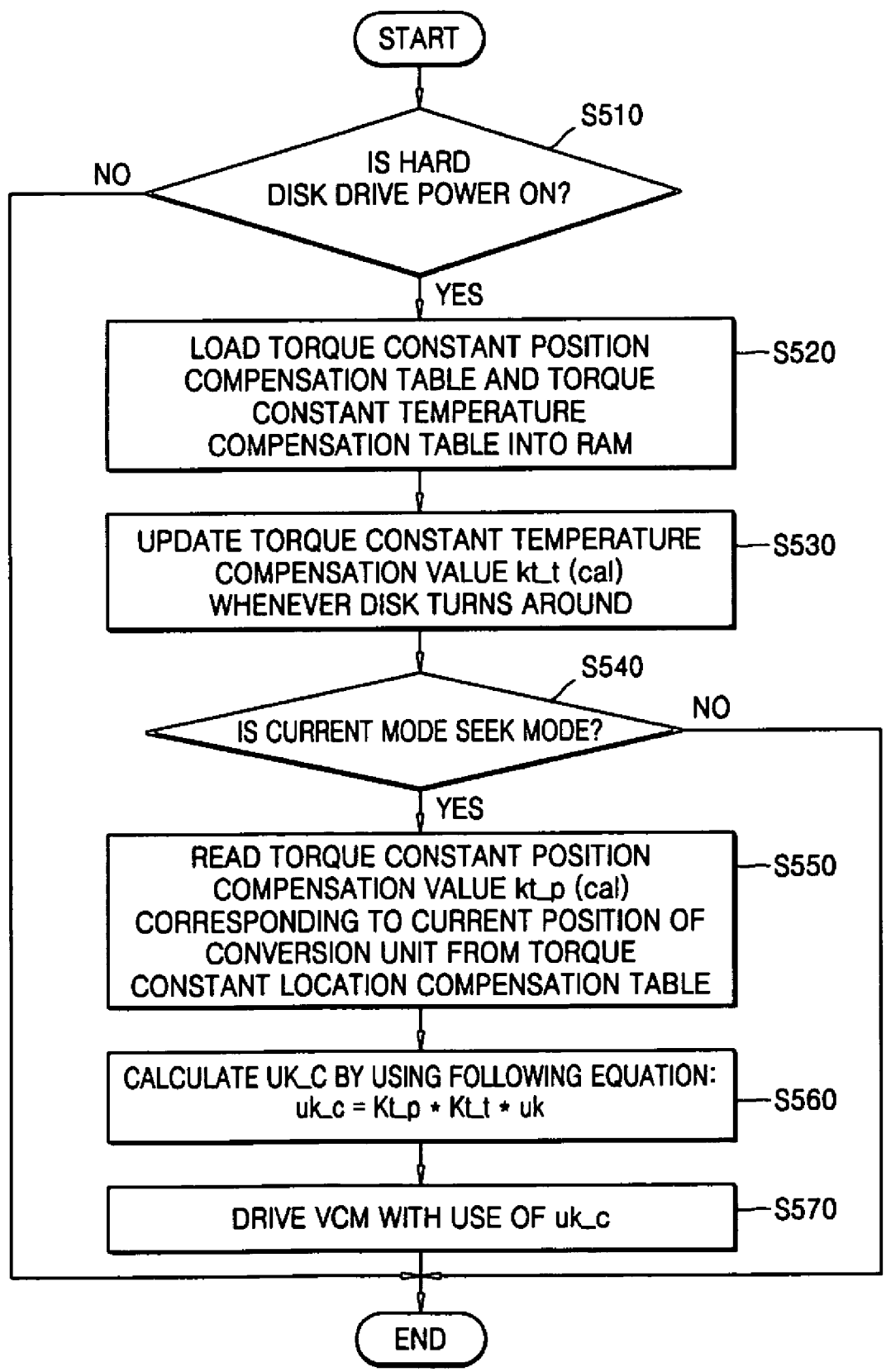
FIG. 5 illustrates a flowchart of a method of compensating for torque variations with respect to temperature and position variations in a seek servo operation, according to an embodiment of the present invention.

Referring to FIG. 5, in operation S510, the control unit 42 can determine whether the hard disk drive 10 has changed into a power-on state and is ready to perform its operations.

In operation S520, if the hard disk drive 10 has changed into the power-on state, the torque constant position compensation table, which has been converted to be compatible with the room temperature condition and stored in the maintenance cylinder of the magnetic disk 12, and the torque constant temperature compensation table, stored in the ROM 50, are loaded into the RAM 52.

In operation S530, the temperature sensing unit 56 can then measure the temperature of the hard disk drive 10 whenever the magnetic disk 12 rotates, for example, and the control unit 42 can read a torque constant temperature compensation value kt_t corresponding to the measured temperature of the hard disk drive 10 from the torque constant temperature compensation table loaded into the RAM 52 and then apply the read torque constant temperature compensation value kt_t to the location-based torque constant compensation unit 76.

In operation S540, the control unit 42 can determine whether the hard disk drive 10 has shifted to seek mode.

In operation S550, if the hard disk drive 10 has shifted to the seek mode, the control unit 42 can determine the position of the transducer 16 by interpreting gray codes detected from the magnetic disk 12 by the transducer 16, read a torque constant position compensation value kt_p (cal) corresponding to the determined position of the transducer 16 from the torque constant position compensation table, loaded into the RAM 52, and then apply the read torque constant position compensation value kt_p to the temperature-based constant compensation unit 74.

In operation S560, a torque compensated seek driving current uk_c, which has been torque-compensated both temperature-wise and position-wise, can be generated by multiplying the torque constant position compensation value kt_p and the torque constant temperature compensation value kt_t by a seek driving current uk(n). Here, the seek driving current uk(n) is a current that is generated based on design acceleration, design velocity, and design position trajectories, for example, and is used for moving the transducer 16 to a target track on the magnetic disk 12 with the use of the seek control loop.

In operation S570, a VCM can thus be driven with the torque-compensated seek driving current uk_c generated in operation S560.

As described above, the gain of a seek control loop is controlled so that a difference between a modelling torque constant, set in a seek servo control circuit of a hard disk drive, and an actual torque constant of the hard disk drive can be compensated for based on the temperature of the hard disk drive. Accordingly, it is possible to enhance the seek control precision and speed of the hard disk drive.

Embodiments of the present invention can be embodied as a method, an apparatus, or a system. When embodied as computer readable code/instructions, e.g., software, elements of embodiments of the present invention may be implemented by code segments, for example. Programs and/or the code segments may be stored in a medium, e.g., a computer-readable recording medium, and/or may be transmitted through a transmission medium and/or over a communications network as computer data signals associated with carrier waves, for example. Examples of the medium may include nearly all kinds of media for storing and/or transmitting data. For example, examples of the medium can include at least an electronic circuit, a semiconductor memory device, a ROM, a flash memory, an erasable ROM, a floppy disk, an optical disk, a hard disk, an optical fiber medium, and a radio frequency (RF) network, etc. Examples of computer data signals include nearly all types of signals that are storable and/or transmittable on such a storage/transmission medium as an electronic network channel, an optical fiber, air, an electromagnetic system, and an RF network, for example.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a hard disk drive, comprising:
controlling gain of a seek control loop to vary based on a torque constant temperature compensation value, corresponding to a measured temperature of the hard disk drive, with the seek control loop generating a seek driving current for application to a voice coil in a seek mode of the hard disk drive,
wherein the torque constant temperature compensation value is determined by:
respectively measuring torque constants at a plurality of zones of a disk at each of a plurality of temperatures;
calculating an average torque constant for each of the plurality of temperatures using the measured torque constants; and
generating a normalized torque constant temperature compensation value for each of the plurality of temperatures by dividing the calculated average torque constant, for each of the temperatures, by an average torque constant for a reference temperature.

2. The method of claim 1, wherein the reference temperature is room temperature.

3. A method of controlling a hard disk drive, comprising:
controlling gain of a seek control loop to vary based on a torque constant temperature compensation value, corresponding to a measured temperature of the hard disk drive, with the seek control loop generating a seek driving current for application to a voice coil in a seek mode of the hard disk drive, wherein the gain of the seek control loop is compensated for by multiplying a torque constant position compensation value, corresponding to a current position of a head of the hard disk drive, by a torque constant temperature compensation value, corresponding to the measured temperature of the hard disk drive.

4. The method of claim 3, wherein the torque constant position compensation value, corresponding to the measured temperature of the hard disk drive, is obtained by dividing the torque constant position compensation value, corresponding to the current position of the head, measured at the current position of the head during a burn-in operation, by a normalized torque constant temperature compensation value corresponding to a temperature of the hard disk drive measured during the burn-in operation.

5. A recording and/or reproducing apparatus, comprising:
a transducer movable across a medium to record and/or reproduce data from the medium; and
a control unit to control movement of the transducer according to the method of claim 3.

6. At least one computer-readable recording medium comprising computer readable code implementing the method of claim 3.

7. An apparatus controlling a hard disk drive, comprising:
a seek control circuit to generate a seek driving current for moving a transducer to a target track through a seek control loop by using at least one of design acceleration, design velocity, and design position trajectories;
a temperature sensing unit to measure a temperature of the hard disk drive;
a memory to store a torque constant position compensation table and a torque constant temperature compensation table, with torque constant temperature compensation values based on a plurality of respective temperature ranges;
a control unit to compensate for gain of the seek control loop by reading a torque constant position compensation value, corresponding to a position of the transducer, from the torque constant position table in the memory and reading a torque constant temperature compensation value, corresponding to the measured temperature of the hard disk drive from the torque constant temperature table in the memory;
a position-based/temperature-based torque constant compensation unit to generate a torque-compensated seek driving current by multiplying each of the torque constant position compensation value and the torque constant temperature compensation value by the seek driving current; and
a voice coil motor driving unit to drive the transducer using the generated torque-compensated seek driving current,
wherein the torque constant temperature compensation table is formed by respectively measuring torque constants at a plurality of zones on a disk at each of a plurality of temperatures, calculating average torque constants for each of the temperatures using the measured torque constants, and generating normalized torque constant temperature compensation values for each of the temperatures by dividing an average torque constant, for each of the zones and for each of the temperatures, by an average torque constant for a reference temperature.

8. The apparatus of claim 7, wherein the control unit controls the measuring of the temperature of the hard disk drive whenever a spindle motor rotates and updates a torque constant temperature compensation value to be applied to the position-based/temperature-based torque constant compensation unit by reading a torque constant temperature compensation value corresponding to the measured temperature of the hard disk drive from the torque constant temperature compensation table.

9. A recording and/or reproducing apparatus, comprising:
a transducer movable across a medium to record and/or reproduce data from the medium; and
the apparatus of claim 7 to control movement of the transducer.

10. An apparatus controlling a hard disk drive, comprising:
a seek control circuit to generate a seek driving current for moving a transducer to a target track through a seek control loop by using at least one of design acceleration, design velocity, and design position trajectories;
a temperature sensing unit to measure a temperature of the hard disk drive;
a memory to store a torque constant position compensation table and a torque constant temperature compensation table, with torque constant temperature compensation values based on a plurality of respective temperature ranges;
a control unit to compensate for gain of the seek control loop by reading a torque constant position compensation value, corresponding to a position of the transducer, from the torque constant position table in the memory and reading a torque constant temperature compensation value, corresponding to the measured temperature of the hard disk drive from the torgue constant temperature table in the memory;
a position-based/temperature-based torque constant compensation unit to generate a torque-compensated seek driving current by multiplying each of the torque constant position compensation value and the torque constant temperature compensation value by the seek driving current; and
a voice coil motor driving unit to drive the transducer using the generated torque-compensated seek driving current,
wherein the torque constant position compensation table is formed by dividing torque constant position compensation values, respectively measured at a plurality of zones on a disk during a burn-in operation, by a normalized torque constant temperature compensation value corresponding to a temperature of the burn-in operation.

* * * * *

UNITED STATES PATENT AND TRADEMARK OFFICE
CERTIFICATE OF CORRECTION

PATENT NO. : 7,342,739 B2
APPLICATION NO. : 11/186756
DATED : March 11, 2008
INVENTOR(S) : Cheol-hoon Park et al.

Page 1 of 1

It is certified that error appears in the above-identified patent and that said Letters Patent is hereby corrected as shown below:

Column 12, Line 41, change "torgue" to --torque--.

Signed and Sealed this

Second Day of September, 2008

JON W. DUDAS
*Director of the United States Patent and Trademark Office*